United States Patent
Britting et al.

(10) Patent No.: US 12,226,856 B2
(45) Date of Patent: Feb. 18, 2025

(54) SOLDER MATERIAL, METHOD FOR PRODUCING A SOLDER MATERIAL OF THIS TYPE AND USE OF A SOLDER MATERIAL OF THIS TYPE IN ORDER TO CONNECT A METAL LAYER TO A CERAMIC LAYER

(71) Applicant: Rogers Germany GmbH, Eschenbach (DE)

(72) Inventors: Stefan Britting, Schnaittach (DE); Tilo Welker, Neuhaus (DE); Karsten Schmidt, Eschenbach (DE)

(73) Assignee: ROGERS GERMANY GMBH, Eschenbach (DE)

( * ) Notice: Subject to any disclaimer, the term of this patent is extended or adjusted under 35 U.S.C. 154(b) by 140 days.

(21) Appl. No.: 17/783,979

(22) PCT Filed: Dec. 3, 2020

(86) PCT No.: PCT/EP2020/084473
§ 371 (c)(1),
(2) Date: Jun. 9, 2022

(87) PCT Pub. No.: WO2021/122036
PCT Pub. Date: Jun. 24, 2021

(65) Prior Publication Data
US 2023/0031736 A1    Feb. 2, 2023

(30) Foreign Application Priority Data
Dec. 19, 2019    (DE) ............ 10 2019 135 171.5

(51) Int. Cl.
*B23K 1/00* (2006.01)
*B23K 35/02* (2006.01)
(Continued)

(52) U.S. Cl.
CPC ........ *B23K 35/0238* (2013.01); *B23K 1/0016* (2013.01); *B23K 2101/36* (2018.08); *B23K 2103/52* (2018.08)

(58) Field of Classification Search
CPC ........ C04B 2237/407; C04B 2237/592; C04B 2237/708; C04B 2237/72; C04B 37/026;
(Continued)

(56) References Cited

U.S. PATENT DOCUMENTS 3,896,542 A * 7/1975 Dale ............... B23K 20/023
257/E23.185
3,902,863 A * 9/1975 Haberstroh ............ B32B 7/12
428/926

(Continued)

FOREIGN PATENT DOCUMENTS

CN    104588863 A * 5/2015 ............ B23K 20/10
CN    105585326 A * 5/2016 ........... C04B 37/006
(Continued)

OTHER PUBLICATIONS

Machine tranlsation of CN107186373A (no date available).*
(Continued)

*Primary Examiner* — Kiley S Stoner
(74) *Attorney, Agent, or Firm* — CANTOR COLBURN LLP (57) ABSTRACT

A solder material (30) for bonding a metal layer (20) to a ceramic layer (10), in particular for forming a metal-ceramic substrate as a carrier for electrical components, comprising:
  a base material and
  an active metal,
    wherein the solder material (30) is a foil comprising the base material in a first layer (31) and the active metal in a second layer (32), and
(Continued)

wherein the foil has a total thickness (GD) which is less than 50 μm, preferably less than 25 μm and particularly preferably less than 15 μm.

13 Claims, 6 Drawing Sheets

(51) Int. Cl.
    *B23K 101/36*     (2006.01)
    *B23K 103/00*     (2006.01)
(58) Field of Classification Search
    CPC .......... C04B 2237/12; C04B 2237/122; C04B 2237/124; C04B 2237/127; C04B 2237/123; C04B 2237/125; C04B 2237/34; C04B 2237/343; C04B 2237/348; C04B 2237/365; C04B 2237/366; C04B 2237/368; C04B 2237/402; C04B 2237/404; B32B 7/12; B32B 15/01; B32B 15/043; B32B 18/00; B32B 2309/105; B32B 2457/08; B32B 15/04; B32B 2250/40; B23K 35/001; B23K 35/0233; B23K 35/0238; B23K 2101/36; B23K 2103/52
    USPC ................. 228/122.1–124.7, 56.3, 245–246
    See application file for complete search history.

(56) References Cited

U.S. PATENT DOCUMENTS

| | | | |
|---|---|---|---|
| 3,981,429 A | 9/1976 | Parker | |
| 4,500,383 A * | 2/1985 | Kashiwagi | C04B 37/021 228/124.1 |
| 4,842,955 A * | 6/1989 | Rabinkin | B23K 35/3006 428/606 |
| 5,028,495 A | 7/1991 | Hirano et al. | |
| 5,192,623 A * | 3/1993 | Gewelber | B23K 1/19 52/791.1 |
| 6,253,986 B1 * | 7/2001 | Brofman | H01L 24/14 257/E23.079 |
| 6,468,669 B1 * | 10/2002 | Hasz | F28F 13/185 428/553 |
| 6,541,075 B2 * | 4/2003 | Hasz | F01D 5/288 427/376.6 |
| 6,598,782 B2 * | 7/2003 | Wieres | B23K 1/0014 228/248.1 |
| 6,722,002 B1 * | 4/2004 | Chang | B21B 3/00 148/426 |
| 6,921,014 B2 * | 7/2005 | Hasz | C23C 28/3455 29/889.721 |
| 7,565,996 B2 * | 7/2009 | Das | B23K 20/02 228/248.1 |
| 10,888,958 B2 * | 1/2021 | Zhang | C22C 13/00 |
| 10,998,250 B2 | 5/2021 | Terasaki | |
| 2002/0088717 A1 * | 7/2002 | Wittebrood | C25D 5/10 428/650 |
| 2002/0155313 A1 * | 10/2002 | Palmgren | B23K 1/19 428/685 |
| 2004/0035910 A1 * | 2/2004 | Dockus | B23K 35/0238 228/56.3 |
| 2004/0060962 A1 * | 4/2004 | Jacobson | B23K 35/001 228/56.3 |
| 2004/0121180 A1 * | 6/2004 | Wittebrood | C22C 21/02 427/446 |
| 2004/0131879 A1 * | 7/2004 | Wittebrood | C25D 5/10 428/653 |
| 2004/0134966 A1 * | 7/2004 | Chang | B23K 35/325 228/56.3 |
| 2004/0188496 A1 * | 9/2004 | Liu | B23K 3/0638 228/56.3 |
| 2005/0194425 A1 * | 9/2005 | Schnittgrund | B23K 35/005 228/122.1 |
| 2006/0013359 A1 | 1/2006 | Schaller et al. | |
| 2006/0078728 A1 * | 4/2006 | Kilmer | C22C 21/02 428/342 |
| 2006/0131359 A1 * | 6/2006 | Pohlman | C22C 14/00 228/56.3 |
| 2007/0158398 A1 * | 7/2007 | Budinger | B23K 1/19 228/262.1 |
| 2008/0035703 A1 * | 2/2008 | Suh | B23K 35/322 228/56.3 |
| 2008/0035707 A1 * | 2/2008 | Glaeser | C04B 37/006 228/121 |
| 2008/0274367 A1 * | 11/2008 | Kilmer | C22C 21/02 428/654 |
| 2010/0035024 A1 * | 2/2010 | Datta | H05K 1/0272 428/471 |
| 2012/0063911 A1 | 3/2012 | Bossmann et al. | |
| 2014/0158423 A1 * | 6/2014 | Anderson | B23K 35/286 148/400 |
| 2014/0272450 A1 * | 9/2014 | Ozbaysal | C22C 19/05 428/607 |
| 2015/0118514 A1 * | 4/2015 | Zhao | C25D 5/48 428/184 |
| 2015/0171271 A1 * | 6/2015 | Inoue | H01L 33/38 257/98 |
| 2016/0101488 A1 * | 4/2016 | Ren | C22C 21/16 428/650 |
| 2017/0084788 A1 * | 3/2017 | Sugiyama | H01L 33/0095 |
| 2017/0162745 A1 * | 6/2017 | Moriyasu | H01L 33/44 |
| 2018/0169796 A1 | 6/2018 | Clark et al. | |
| 2021/0269897 A1 * | 9/2021 | Ren | C22F 1/04 |
| 2023/0028846 A1 * | 1/2023 | Jacoby | C22C 21/02 |

FOREIGN PATENT DOCUMENTS

| | | | | |
|---|---|---|---|---|
| CN | 105585328 A | * | 5/2016 | .......... C04B 37/026 |
| CN | 106167902 A | * | 11/2016 | .......... C23C 24/04 |
| CN | 106735672 A | * | 5/2017 | .......... B23K 1/06 |
| CN | 106825999 A | * | 6/2017 | .......... B23K 35/40 |
| CN | 107186373 A | * | 9/2017 | .......... B23K 35/0238 |
| DE | 19927046 B4 | | 1/2007 | |
| DE | 102009033029 A1 | | 1/2011 | |
| DE | 102011008311 A1 | | 10/2011 | |
| DE | 102013104739 A1 | | 9/2014 | |
| DE | 102015108668 A1 | | 12/2016 | |
| DE | 102017004626 A1 | * | 11/2018 | .......... B23K 35/0238 |
| EA | 201900203 A1 | * | 5/2020 | |
| EP | 0342506 A1 | | 11/1989 | |
| EP | 380200 A | * | 8/1990 | .......... B23K 35/0238 |
| EP | 0380200 A1 | * | 8/1990 | |
| EP | 2978019 A1 | | 1/2016 | |
| EP | 3705464 A1 | * | 9/2020 | .......... B23K 1/00 |
| EP | 4071128 A1 | * | 10/2022 | .......... B23K 1/0016 |
| JP | 561135498 A | | 6/1986 | |
| JP | 662199288 A | | 9/1987 | |
| JP | 04026569 A | * | 1/1992 | |
| JP | 3041531 B2 | * | 5/2000 | |
| JP | 2003212669 A | * | 7/2003 | .......... B23K 1/0008 |
| JP | 2007515293 A | | 6/2007 | |
| JP | 2014157698 A | * | 8/2014 | .......... C09K 11/7774 |
| JP | 2019085327 A | | 6/2019 | |
| JP | 2019196548 A | * | 11/2019 | |
| JP | 2019199650 A | * | 11/2019 | |
| KR | 20180059777 A | * | 6/2018 | |
| RU | 2722294 C1 | * | 5/2020 | |
| WO | WO-2014123145 A1 | * | 8/2014 | .......... C09K 11/7774 |
| WO | WO-2019166259 A1 | * | 9/2019 | .......... C04B 37/021 |

OTHER PUBLICATIONS

International Preliminary Report on Patentability for International Application No. PCT/EP2020/084473, Filing Date: Dec. 3, 2020; Date of Mailing: Jun. 22, 2023, 5 pages.

* cited by examiner

SOLDER MATERIAL, METHOD FOR PRODUCING A SOLDER MATERIAL OF THIS TYPE AND USE OF A SOLDER MATERIAL OF THIS TYPE IN ORDER TO CONNECT A METAL LAYER TO A CERAMIC LAYER

CROSS-REFERENCE TO RELATED APPLICATIONS

This application is a National Stage filing of PCT/EP2020/084473, filed Dec. 3, 2020, which claims priority to DE 10 2019 135 171.5, filed Dec. 19, 2019, both of which are incorporated by reference in their entirety herein.

BACKGROUND

The present invention relates to a solder material, a method for producing such a solder material and a use of such a solder material for bonding a metal layer to a ceramic layer.

Metal-ceramic substrates are sufficiently known from the prior art, for example as printed circuit boards or printed circuit boards, for example from DE 10 2013 104 739 A1, DE 19 927 046 B4 and DE 10 2009 033 029 A1. Typically, connection areas for electrical components and conductors are arranged on one component side of the metal-ceramic substrate, whereby the electrical components and the conductors can be interconnected to form electrical circuits. Essential components of the metal-ceramic substrates are an insulation layer, which is preferably made of a ceramic, and at least one metal layer bonded to the insulation layer. Due to their comparatively high insulation strengths, insulation layers made of ceramics have proven to be particularly advantageous in power electronics. By structuring the metal layer, conductive tracks and/or connection areas for the electrical components can then be realised.

The prerequisite for providing such a metal-ceramic substrate is a permanent bond between the metal layer and the ceramic layer. In addition to a so-called direct bonding process, i.e., a DCB or DAB process, it is known from the prior art to bond the metal layer to the ceramic layer via a solder material.

An active soldering process, e.g., for bonding metal layers or metal foils, in particular also copper layers or copper foils, to ceramic material, is to be understood as a process which is used specifically for the production of metal-ceramic substrates. In this process, a connection between a metal foil, for example a copper foil, and a ceramic substrate, for example an aluminium nitride ceramic, is produced at a temperature between approx. 650-1000° C. using a solder alloy which also contains an active metal in addition to a main component such as copper, silver and/or gold. This active metal, which is for example at least one element from the group Hf, Ti, Zr, Nb, Ce, establishes a connection between the solder alloy and the ceramic by chemical reaction, while the connection between the solder alloy and the metal is a metallic solder connection.

From US 2018 0 169 796 A, a three-layer solder material is known in which the outer layers are formed by two layers of active metal. The foils are thicker than 100 µm.

U.S. Pat. No. 6,722,002 B1 describes a method in which a titanium foil is arranged between copper or copper/nickel foils by rolling to form a solder foil. The foil thicknesses are above 100 µm.

U.S. Pat. No. 3,981,429 describes a multilayer solder foil in which one titanium layer has a thickness thinner than 25 µm. This solder foil is intended for use in aircraft construction, in particular for bonding to a honeycomb structure.

It is an object of the present invention to provide a solder material which is improved compared to the solder materials known from the prior art, in particular with regard to the bonding of a metal layer to a ceramic layer.

SUMMARY OF THE INVENTION

The present invention solves this problem with a solder material, 1, a method for producing the solder material, and with the use of the solder material, each as described herein. Further embodiments are to be taken from the drawings, the claims and the description.

According to a first aspect of the present invention, a solder material for bonding a metal layer to a ceramic layer, in particular for forming a metal-ceramic substrate as a carrier for electrical components, is provided, comprising:
 a base material and
 an active metal,
wherein the solder material is a foil having the base material in a first layer and the active metal in a second layer, and wherein the foil has a total thickness which is less than 25 µm and more preferably less than 15 µm.

BRIEF DESCRIPTION OF THE DRAWINGS

Further advantages and features can be seen in the following description of preferred embodiments of the object according to the invention with reference to the attached figures. Individual features of the individual embodiments can be combined with each other within the scope of the invention.

The Figures show.

DETAILED DESCRIPTION

Compared to the solder materials known from the prior art, it is provided according to the invention that the total thickness of the foil is less than 50 µm, preferably less than 25 µm and particularly preferably less than 15 µm. This proves to be advantageous not only because the reduced thickness of the solder material saves material, but also because the active metal has to bridge a comparatively small distance to the ceramic layer and/or metal layer in order to form a reaction layer there, which enables bonding in the AMB process. In particular, it has proven to be particularly advantageous to use such solder materials to bond metal layers to ceramic layers in order to form metal-ceramic substrates that serve as carriers for electrical components. These carriers or these metal-ceramic substrates are particularly exposed to thermal stresses both during production and in operation, which typically lead to comparatively high thermomechanical stresses due to the different expansion coefficients of metal and ceramic, which in turn can damage the metal-ceramic substrate or shorten its service life. Accordingly, special requirements are placed on the solder material used here, which is intended for bonding a metal layer to a ceramic layer. It has been found that such thin solder materials with a first layer of active material and a second layer of a base material can be used as a foil to achieve a permanent and stable bond between a metal layer and a ceramic layer.

Furthermore, it is preferably provided that the total thickness assumes a value between 2 and 50 µm, preferably a value between 4 and 25 µm and particularly preferably between 6 and 15 µm. It has been found that solder materials formed as foils with such thicknesses are sufficiently thick to realise a connection between the ceramic layer and the metal layer in a process-safe manner. The indicated total thicknesses have proven to be particularly advantageous for such foils or solder materials in which the outermost layers, for example the first and third layers or a final protective layer, are free of active metals.

Examples of an active metal are titanium (Ti), zirconium (Zr), hafnium (Hf), chromium (Cr), niobium (Nb), cerium (Ce) and vanadium (V). In particular, the base material is a metal-based base material, preferably a silver-based base material or a copper-based base material. In a silver-based base material, silver is the main component, i.e., the component with the highest percentage by weight, whereas in a copper-based base material, copper is the main component. Examples of a silver-based base material are AgCu, in particular AgCu28, AgCuIn, AgCuSn and AgCuGa. Examples of a copper-based base material are copper CuSn, Cu—Ag, CuIn, CuGa, CuInSn, CuInMb, CuGaSn. It is also conceivable to use NiCrMn or SnCu as the base material. Preferably, the solder material is a silver-copper-titanium mixture comprising 65 to 75 wt % and 20 to 30 wt % and titanium 2 to 8 wt % Ti, wherein silver and copper are present as base material in the first layer and third layer, respectively, and titanium is present as active material in the second layer, and preferably the sum of silver-copper-titanium constitutes essentially 100 wt % of the solder material, i.e., except for a minor amount of impurities. Such a composition of silver, copper and titanium is also known as TiCuSil®, distributed by the company Morgan Advanced Materials.

Conceivable materials for the metallisation or the metal layer in the metal-ceramic substrate are copper, aluminium, molybdenum and/or their alloys, as well as laminates such as CuW, CuMo, CuAl, AlCu and/or CuCu, in particular a copper sandwich structure with a first copper layer and a second copper layer, wherein a grain size in the first copper layer differs from the grain size in a second copper layer. Furthermore, it is preferably provided that the at least one metallisation, in particular the component metallisation, is surface-modified. A conceivable surface modification is, for example, sealing with a precious metal, in particular silver and/or gold, or ENIG ("electroless nickel immersion gold") or edge sealing on the first or second metallisation layer to suppress crack formation or expansion.

Preferably, the ceramic layer has $Al_2O_3$, $Si_3N_4$, AlN, an HPSX ceramic (i.e. (i.e. a ceramic with an $Al_2O_3$ matrix comprising an x-percent share of $ZrO_2$, for example $Al_2O_3$ with 9% $ZrO_2$=HPS9 or $Al_2O_3$ with 25% $ZrO_2$=HPS25), SiC, BeO, MgO, high-density MgO (>90% of the theoretical density), TSZ (tetragonally stabilised zirconium oxide) or ZTA as material for the ceramic. It is also conceivable that the ceramic layer is designed as a composite or hybrid ceramic, in which several ceramic layers, which differ in terms of their material composition, are arranged on top of each other and joined together to form an insulating layer in order to combine various desired properties. It is also conceivable that a metallic intermediate layer is arranged between two ceramic layers, which is preferably thicker than 1.5 mm and/or thicker than the two ceramic layers in total. Preferably, a ceramic that is as thermally conductive as possible is used for the lowest possible thermal resistance.

It is expedient that the solder material is silver-free. This advantageously avoids silver migration and/or the formation of a silver layer in the boundary layer area between the metal layer and the ceramic layer, which is difficult to etch away and is particularly disadvantageous when producing structures in the metal layer for the formation of conductive paths in the context of "second etching". In addition, the use of a silver-free solder material proves to be particularly economical, as the comparatively expensive silver can be dispensed with. Preferably, this is a copper-based solder material. Furthermore, for the person skilled in the art, silver-free is understood to be when a proportion of silver in the solder material is less than 2 wt % preferably less than 1 wt % and particularly preferably less than 0.2 wt %. It is also conceivable that a proportion of silver in the solder material is less than 15 wt %, preferably less than 10 wt % and particularly preferably less than wt %.

According to a preferred embodiment, it is provided that the foil comprises a third layer, said third layer comprises said base material or a further base material different from the base material, wherein said second layer is arranged along a stacking direction between said first layer and said third layer. Advantageously, this makes it possible to provide a sandwich structure in which preferably the active metal is arranged between the first layer and the third layer. Alternatively, it is conceivable that the first layer and the third layer are formed from one or different active metals, while the second layer provides the base material and is arranged between the first and third layers.

According to a further preferred embodiment, it is provided that the first layer has a first thickness, the second layer has a second thickness and the third layer has a third thickness, wherein the second thickness is thinner than the first thickness and/or the third thickness, in particular thinner than the sum of the first and third thickness, wherein in particular a ratio of the second thickness to the first thickness assumes a value between 0.01 and 0.3, preferably between 0.01 and 0.2 and particularly preferably between 0.01 and 0.1. In other words, the second layer, which preferably contains active metal or consists of active metal, is comparatively thin compared to the first and third layers. It has been found that even with comparatively small amounts of active metal, especially between the first and third layer, a sensible and effective bond between the joining partners, i.e., between the metal layer and the ceramic layer, is possible. It has also been found that the second layer, in particular if it is made of active metal, can have cracks or does not have to be uninterrupted or continuous in order to be able to form an effective bond between the metal layer and the ceramic layer via the solder material. I.e., it is conceivable that the second layer in the solder material has interruptions in a direction parallel to the main extension plane.

Preferably, the second layer is patterned and/or has interruptions. In particular, the pattern is formed by recesses or cut-outs in the second layer, which are let into the second layer before the first and second layers are joined. For example, these recesses and cut-outs are embedded in the second layer by means of an embossing tool and/or by means of a laser in order to form a structuring or patterning, before the second layer is joined to the first layer and/or the third layer. This proves to be particularly advantageous if the joining is carried out by roll cladding or plating, since in such a case, due to the different yield strengths, it is possible to allow the base material from the first and/or second layer to break into or penetrate the corresponding recess and/or cut-out in the second layer, whereby actual plating can take place over the first and third layers. Preferably, it is conceivable that the patterning is carried out in dependence on a planned conductor track pattern in the manufactured metal-ceramic substrate. This means that the patterning essentially corresponds to a planned conductive pattern or a part of a planned conductive pattern. In this way, it is possible to accumulate active metal in the areas in which electrical conductors and/or connection surfaces are planned in the subsequently manufactured metal-ceramic substrate, while active metal is not used in the areas in between. This proves to be advantageous because the areas that are to be exposed anyway can then be removed more easily, for example in the context of etching, in particular "second etching". For example, it is conceivable that the pattern is designed in such a way that an active-metal-free area of the solder material can be arranged above a planned course of a nominal breaking line during the production of the metal-ceramic substrate. Preferably, the solder material comprises an orientation aid in order to be able to align the solder material, in particular the pattern, as desired or in order to recognise, before structuring or etching, at which position an active-metal-free region is arranged. For the person skilled in the art, interruptions in the second layer also mean cracks in the second layer, which occur, for example, during joining, and which are distributed, for example, in an uncontrolled or unsystematic manner in a plane running parallel to the main extension plane in the second layer.

Preferably, the foil has a protective layer, in particular a protective layer that closes off the solder material as seen in the stacking direction. This protects the solder material from unwanted oxidation, abrasion or scratches. This makes it possible to achieve comparatively long storage times, which further simplify the handling of the solder material. For example, the protective layers are layers of copper, silver, indium, nickel and/or titanium nickel (TiN). Such protective layers are preferably realised as part of a physical or chemical vapour deposition process.

Preferably, it is provided that the first thickness is different from the third thickness. This makes it possible to ensure that the second layer is not aligned centrally, but asymmetrically in the direction of the stacking direction within the solder material. This is particularly advantageous if one of the joining partners, for example the ceramic layer and/or the metal layer, requires a higher proportion of active material in order to ensure an effective bond via the solder material.

Another aspect of the present invention is a method of manufacturing a solder material according to the invention, wherein the first layer and the second layer and preferably the third layer are assembled, preferably joined, into a foil. For example, the production takes place within the scope of a pressing process, for example a roll cladding, explosive cladding, hot pressing and/or rolling. Thus, total thicknesses of less than 20 μm are possible. Furthermore, it is conceivable that the assembly of the first, the second and the third layer is realised by means of a deposition process, for example by means of a physical or chemical vapour phase deposition process, e.g., a sputtering process. For example, the active material is sputtered onto the base material or the base material is sputtered onto the active material. In this way, solder foils can be obtained which have a total thickness of less than 8 μm or less than 5 μm, for example. Alternatively, it is conceivable that the first layer, second layer and/or third layer are assembled by means of an electroplating or electrochemical process. For example, this can be a galvanic tank coating or galvanic rolling. In this way, total thicknesses of less than 5 μm or even 3 μm can be achieved. All the features and advantages described for the solder material apply analogously to the process and vice versa.

Preferably, starting foils for the first layer, the second layer and the third layer are chosen which are already thinner than 100 μm, preferably thinner than 80 μm and especially preferably thinner than 50 μm before joining.

It is advisable that a pattern is embedded in the second layer before assembling the first layer and the second layer, and preferably the third layer. A corresponding patterning or structuring of the second layer by means of introducing recesses or cut-outs proves to be advantageous in particular if the base material of the first layer and/or of the third layer can penetrate into this recess of the second layer in order to enable direct plating between the first and third layers. For example, the pattern in the second layer is embedded in the second layer by an embossing or stamping process or by a cutting process using laser light.

Preferably, the foil is placed on the metal layer and/or the ceramic layer, following formation of the foil, which are bonded to each other with the foil. For example, the foil is placed on the metal layer and/or the ceramic layer immediately after fabrication. Alternatively, it is also conceivable that the foil is stored temporarily, for example as a "coil".

A further object of the present invention is a use of a solder material according to the invention for bonding a metal layer to a ceramic layer, in particular for forming a metal-ceramic substrate. All the features and properties described for the solder material can be transferred analogically to the use and vice versa. As already indicated, the use of the solder material according to the invention proves to be advantageous in particular when it is used to bond metal layers to ceramic layers, in particular for the purpose of forming a metal-ceramic substrate which serves as a carrier for electrical or electronic components. It is conceivable, in the context of the use of the solder material, to subject the ensemble of ceramic layer, metal layer and solder material to a temperature treatment after placing the solder material between the ceramic layer and the metal layer. It is conceivable that the temperature treatment comprises a temporal variation in the temperature development, for example the use of ramp-like temperature curves during the bonding process. Preferably, a working temperature of about 900° C. is used. Preferably, a working temperature of between 650° C. and 1050° C., preferably between 700° C. and 1000° C. and particularly preferably between 750° C. and 950° C. is used in the bonding process.

Further advantages and features can be seen in the following description of preferred embodiments of the object according to the invention with reference to the attached figures.

Figure 1:
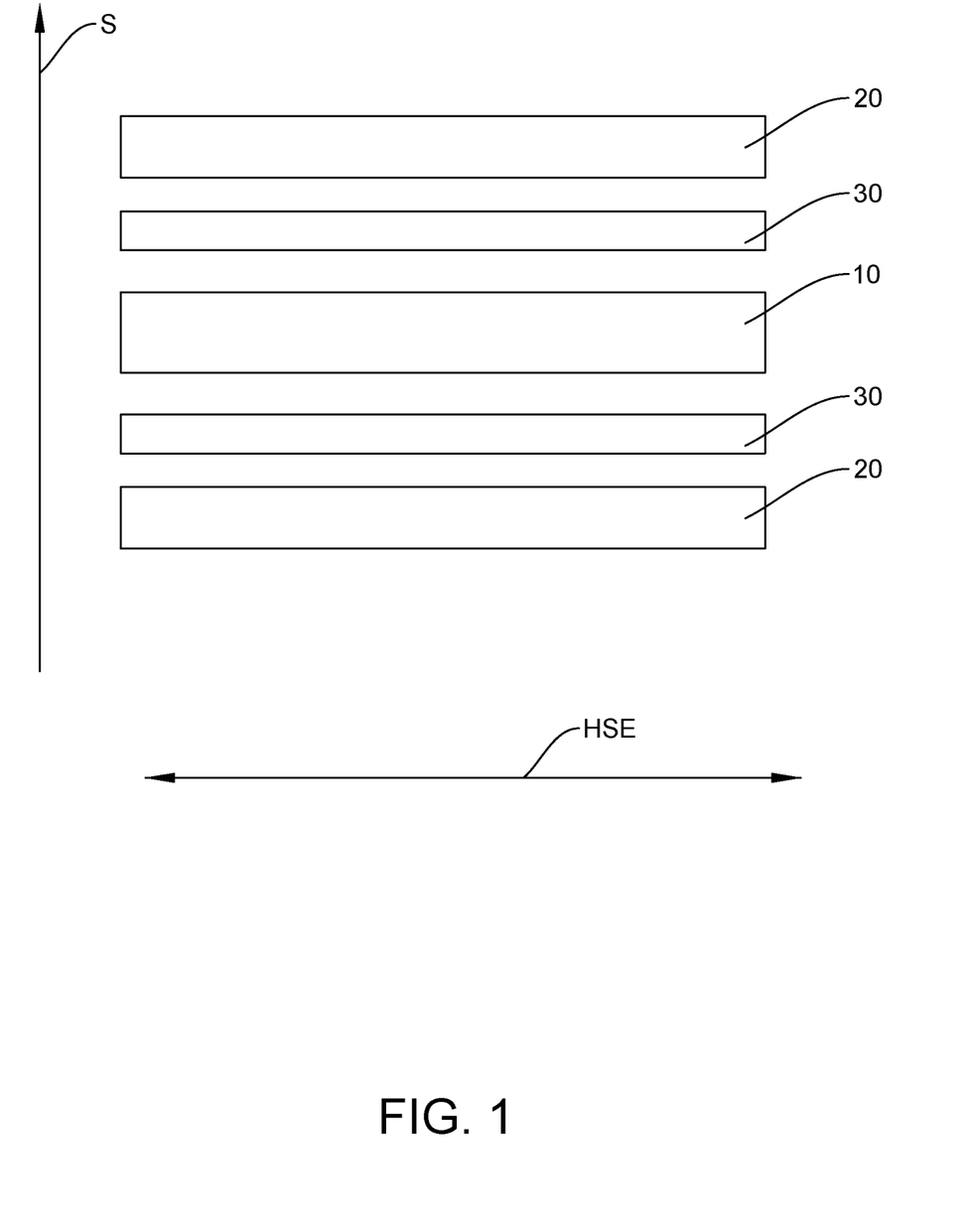
FIG. 1: a schematic representation of a ceramic layer, a solder material and a metal layer.

FIG. 1 shows a ceramic layer 10 and a metal layer 20 to be bonded with a solder material 30. Such a solder material 30 is preferably used for an active soldering process in which a metal layer 20 is bonded to a ceramic layer 10 to form a metal-ceramic substrate. The metal layer 20 and the ceramic layer 10 extend along a main extension plane HSE and are stacked on top of each other along a stacking direction S perpendicular to the main extension plane HSE. In particular, this is a solder material 30 in the form of a foil. The joining of the individual joining partners, i.e., the metal layer 20 and the ceramic layer 10, is carried out at a working temperature intended for the respective solder material 30, for example 900° C. The active metal contained in the solder material 30 forms a reaction layer with the surface to be joined, in particular the surface of the ceramic layer 10. This reaction layer is in turn wetted by the base material. In this way, the bonding between a metal layer 20 and a ceramic layer 10 can be realised within the framework of the active soldering process, provided that they withstand the temperatures prevailing during the bonding or soldering process. In particular, it is envisaged that the solder material 30 is arranged between the metal layer 20 and the ceramic layer 10 for bonding.

After joining the metal layer 20 and the ceramic layer 10, the metal layer 20 is structured, for example by etching, laser light and/or milling, to form conductive tracks and/or connection surfaces, whereby the metal-ceramic substrate can be used as a printed circuit board.

Figure 2:
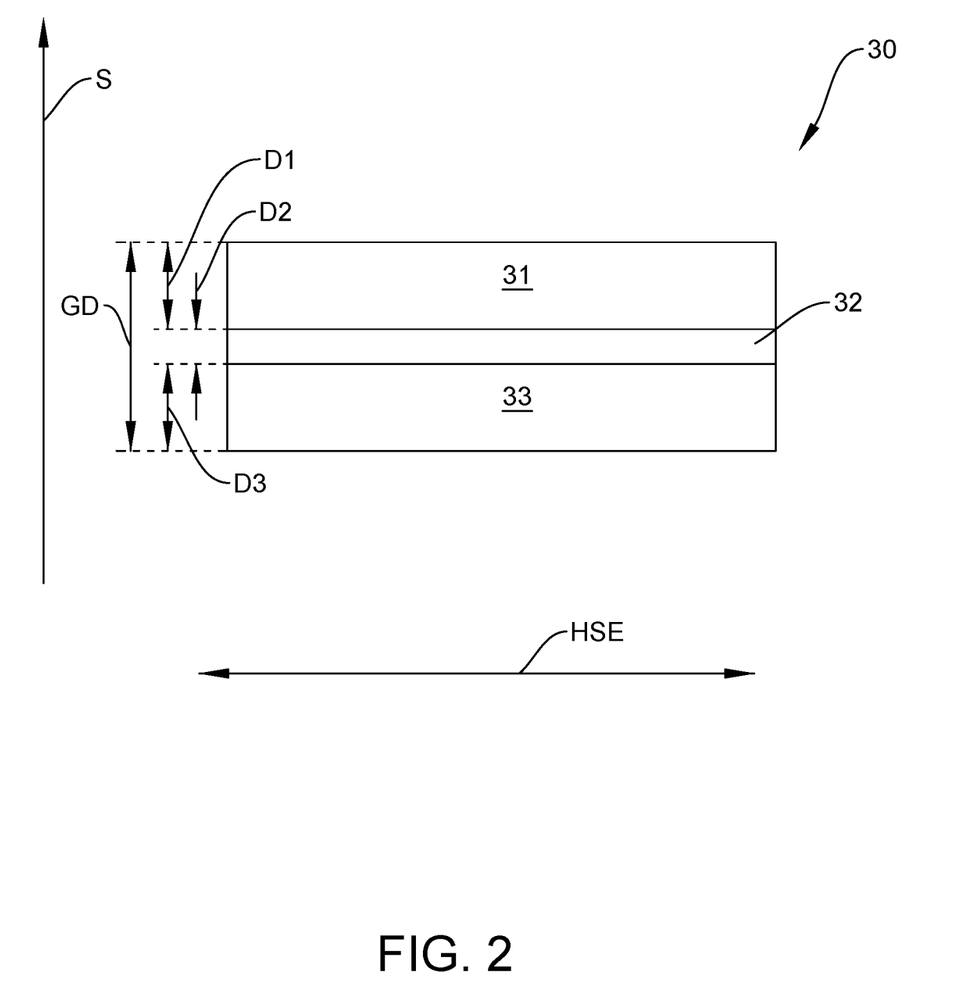
FIG. 2: a solder material according to a preferred embodiment of the present invention.

FIG. 2 shows a solder material 30 according to a preferred embodiment of the present invention. In particular, the solder material 30 comprises a first layer 31 and a second layer 32. The solder material 30 provided as a foil is composed of a first layer 31 of a base material and a second layer 32 of an active material. Preferably, the solder material 30 comprises a third layer 33, wherein in particular the second layer 32 of the active material is arranged between the first layer 31 of the base material and the third layer 33 of the base material and/or of a further base material different from the base material of the first layer 31. In other words, the first layer 31, the second layer 32 and the third layer 33 form a sandwich structure, in particular a trimetal structure. Alternatively, it is conceivable that the first layer 31 and the third layer 33 are formed of the same or different active materials, while between the first layer 31 and the third layer 33 of active material in the form of the second layer 32 the base material is arranged. In this case, the first layer 31 and the third layer 33 are preferably surrounded or encased by a further protective layer.

It is preferably provided that the first layer 31, the second layer 32 and the third layer 33 are arranged one above the other as seen in a stacking direction S, the first layer 31 having a first thickness D1, the second layer 32 having a second thickness D2 and the third layer 33 having a third thickness D3, as measured in the stacking direction S. In particular, it is provided that a ratio of the second thickness D2 to the first thickness D1 and/or to the third thickness D3 assumes a value between 0.01 and 0.3, preferably between 0.01 and 0.2 and particularly preferably between 0.01 and 0.1. Furthermore, it is conceivable that the first thickness D1 differs from the third thickness D3 so that the second layer 32, viewed in the direction of the stacking direction S, is not arranged centrally but asymmetrically in the composite of first layer 31, second layer 32 and third layer 33.

Furthermore, it is particularly preferred that the foil has a total thickness GD which is less than 50 µm, preferably less than 25 µm and more preferably less than 15 µm. The total thickness GD of the foil is preferably measured along the stacking direction S of the outer sides which are in contact with or adjacent to the ceramic layer 10 or the metal layer 20 during the bonding process. Such thin solder materials 30 are not only advantageous because of the reduced material costs, but also with regard to the distance which the active material has to overcome in order to reach the boundary layer between solder material 30 and ceramic layer 10 or solder material 30 and metal layer 20. This ensures that sufficient active material reaches the boundary area to the ceramic layer 10 or metal layer 20 in order to form the reaction layer there. This in turn proves to be additionally advantageous for the amount of active material required for a successful bond between the metal layer 20 and the ceramic layer 10.

Figure 3:
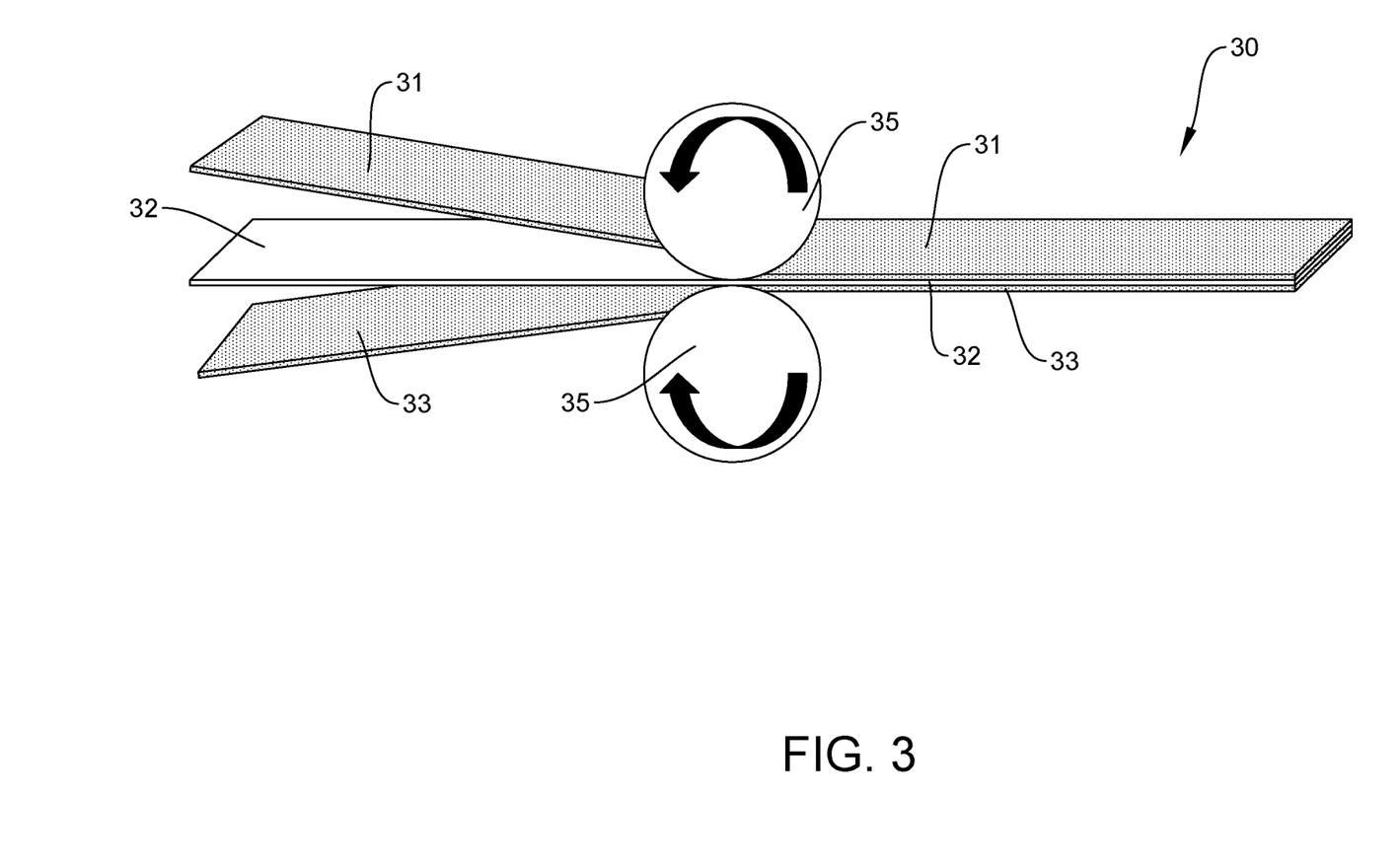
FIG. 3: a method of manufacturing a solder material according to a first preferred embodiment of the present invention.

FIG. 3 shows a method for producing the solder material 30 according to a first exemplary embodiment of the present invention. In particular, the method of the embodiment example of FIG. 3 provides that the first layer 31, the second layer 32 and the third layer 33 are prepared and joined together in a roll plating operation using rolls 35. Preferably, starting foils are selected for the first layer 31, the second layer 32 and the third layer 33 which are already thinner than 200 µm, preferably thinner than 100 µm and particularly preferably thinner than 50 µm before joining.

For example, it is conceivable to use a titanium grade 1 or a titanium 4N layer as the second layer 32, which has a second thickness D2 of 10 µm, for example. The ensemble of first layer 31, second layer 32 and third layer 33 joined together in the roll cladding or rolling step forms a solder foil or solder material 30 due to the roll cladding, the total thickness GD of which is half as great as the summed thickness of the first layer 31, the second layer 32 and the third layer 33 before joining. It is particularly preferable that following the rolling step provided for joining, i.e., a joining rolling step, at least one further rolling step, preferably several further rolling steps, are provided in order to further reduce the total thickness GD of the solder material 30. In particular, when second layers 32, preferably second layers 32 of active material, are used between a first layer 31 and a third layer 33, preferably of the base material or further base material, cracks will appear in the second layer 32 due to the roll cladding or repeated roll cladding. It has been found that successful bonding of metal layer 20 and ceramic layer 10 is possible despite these cracks or interruptions.

Figure 4:
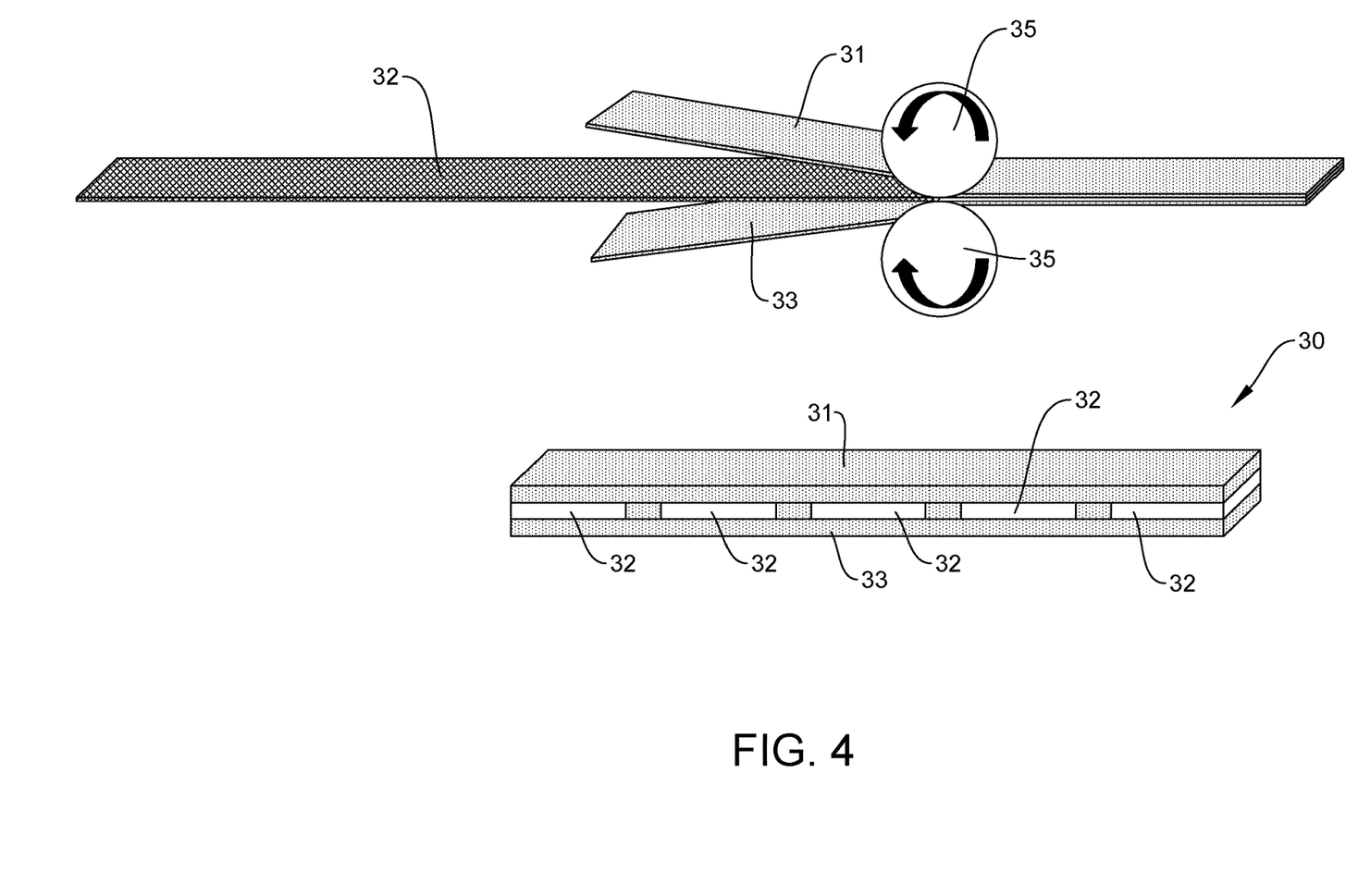
FIG. 4: A method of manufacturing a solder material according to a second preferred embodiment of the present invention.

FIG. 4 shows a method of manufacturing a solder material 30 according to a second exemplary embodiment of the present invention. The embodiment again uses roll cladding to join the first layer 31, the second layer 32 and the third layer 33 to form the solder material 30. The method shown in FIG. 4 differs from the method shown in FIG. 3 in that the second layer 32 is structured, i.e., it is patterned or has deliberately embedded interruptions. In particular, cut-outs or recesses or interruptions are let into the second layer 32, into which the first layer 31 and/or the third layer 33 can penetrate or be displaced during roll cladding. This proves to be particularly advantageous if the base material or the choice of base material results in the first layer 31 or the third layer 33 differing from the second layer 32 with regard to their yield strengths. By using the cut-out or recess in the second layer 32, the second layer 32, in particular the second layer 32 formed as an active material layer, can then advantageously break into it during roll cladding and the actual cladding process takes place via the first layer 31 and third layer 33 in the fracture zones, i.e., the areas between two cut-outs or recesses. For example, a saw tool or a laser is used to form the pattern or structuring in the second layer 32. Alternatively to roll cladding, explosive cladding, hot pressing and/or rolling can also be used. By means of this process, total thicknesses GD for solder foils smaller than 20 µm can be achieved.

Figure 5:
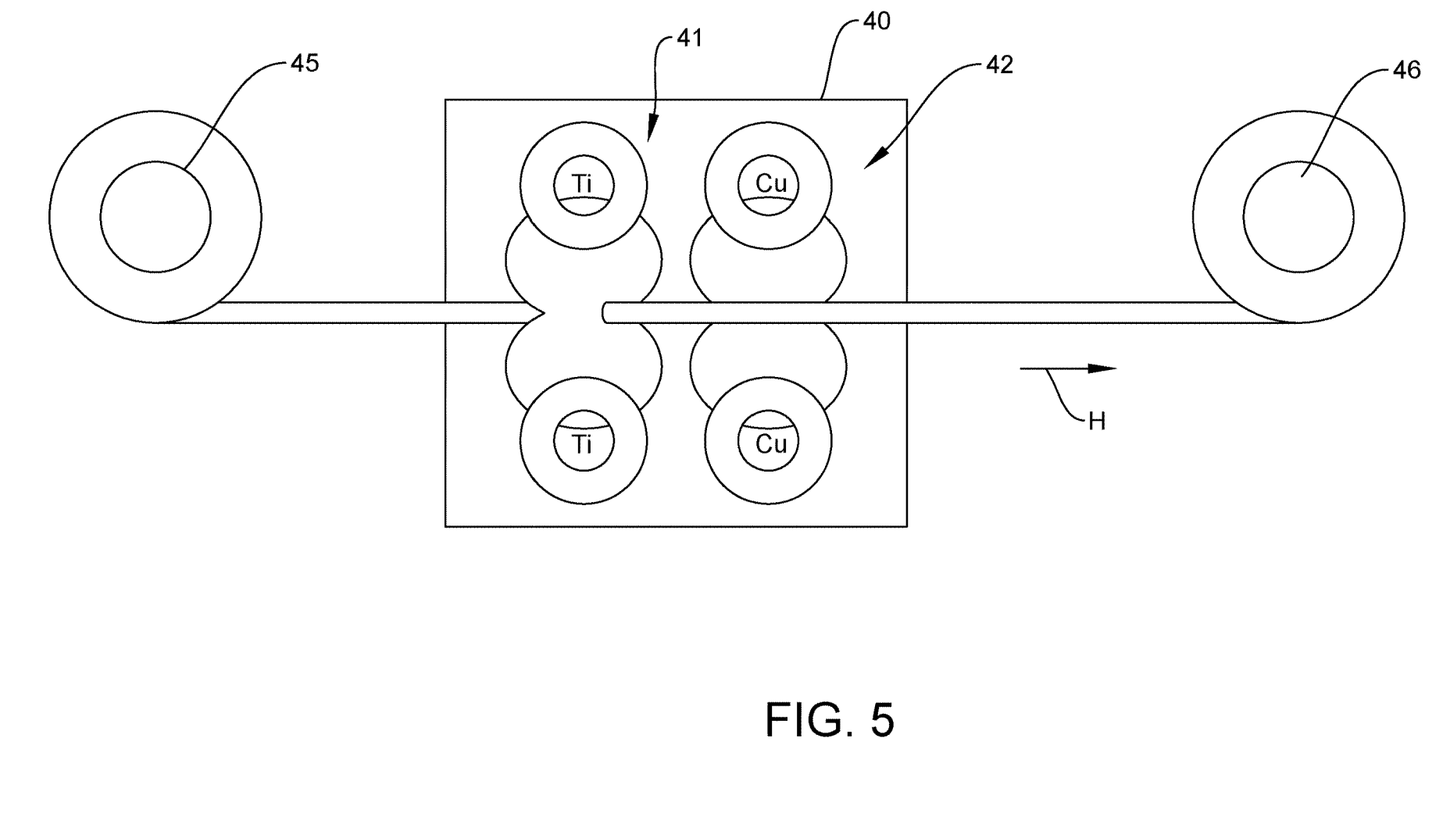
FIG. 5: a method for producing a solder material according to a third preferred embodiment of the present invention.

FIG. 5 shows a method for producing a solder material 30 according to a third exemplary embodiment. In the illustrated embodiment, the second layer 32 passes through a coating device 40. For this purpose, the second layer 32, which is formed in particular from base material or active metal or active material, is unwound from a first roll 45 and then conveyed along a conveying direction F in order to be wound onto a second roll 46 after leaving the coating device 40. The coating device 40 preferably coats a front and/or a back side of the second layer 32 by means of a deposition process, in particular a chemical or physical vapour phase deposition process, such as a sputtering process. In the embodiment shown in FIG. 5, active material in the form of titanium is applied to the outer surfaces of the second layer 32 by means of a first deposition device 41. Following the application of the active material, an additional coating is applied by means of a further vapour deposition by a second deposition device 42, which in turn covers the active material with a protective layer, preferably in the form of copper. Preferably, the vapour deposition process of the first deposition device 41 and/or the second deposition device 42 takes place on both sides of the second layer 32, which is moved along the second conveying direction F.

Figure 6:
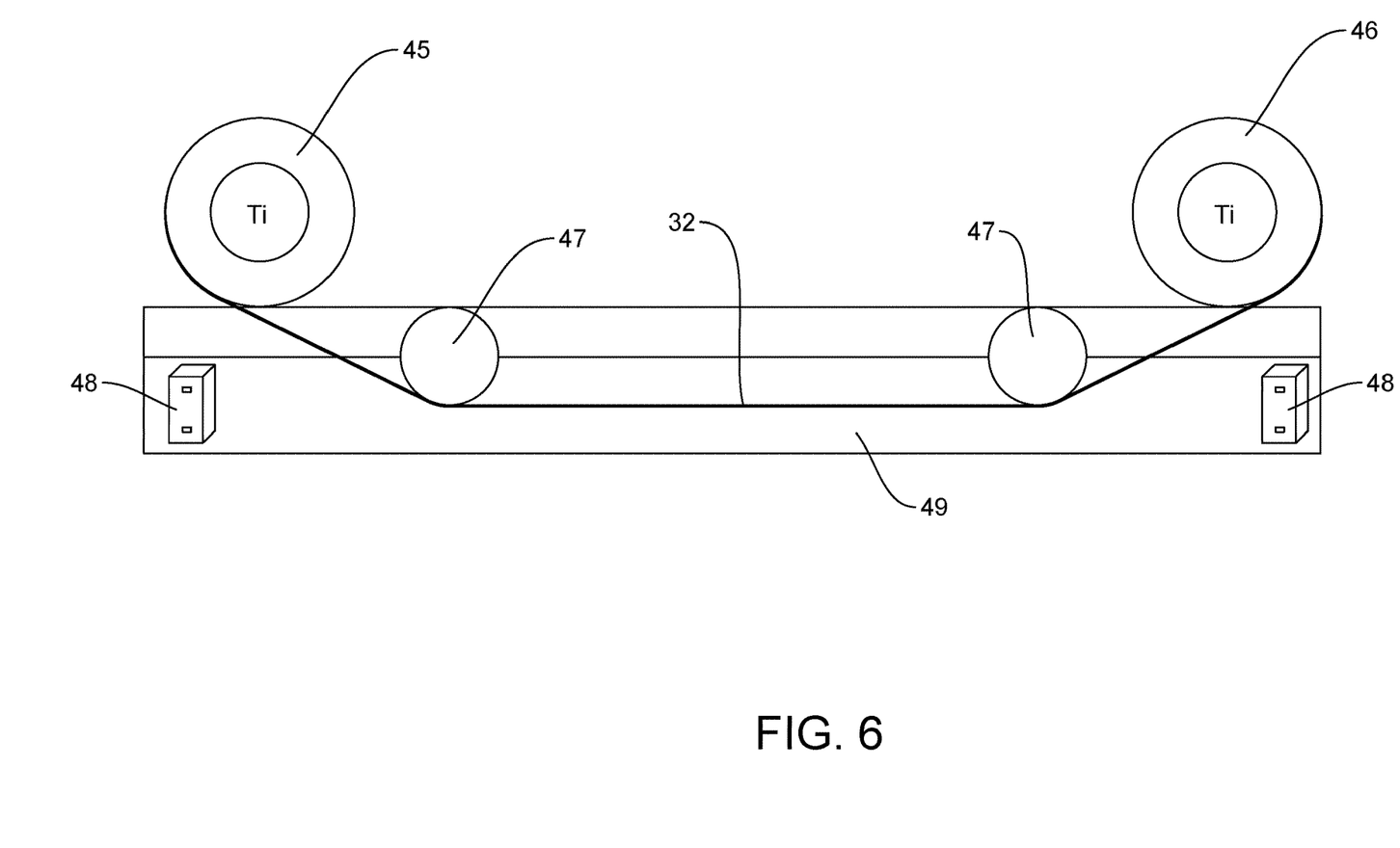
FIG. 6: a method of producing a solder material according to a fourth preferred embodiment of the present invention.

FIG. 6 shows a method for producing a solder material 30 according to a fourth exemplary embodiment. In particular, it is provided that the first layer 31 and the third layer 33 are applied galvanically or electrochemically to the second layer 32.

Preferably, the second layer 32 is an active metal foil. The second layer 32 rolled up on the first roll 45 is then unrolled and guided via deflection rolls 47 through a vessel containing a galvanic medium 49 and electrodes 48.

Together with the electrodes 48 and the galvanic medium 49, it is thus ensured that the second layer 32 is covered with the corresponding base material, so that the first layer 31 and the second layer 32 of base material are formed. In this way, solder foils 30 can be advantageously produced whose total thickness GD is less than 5 µm or even 3 µm.

REFERENCE NUMERALS LIST 10 ceramic layer
20 metal layer
30 solder material
31 first layer
32 second layer
33 third layer
35 roll
40 coating device
41 first deposition device
42 second deposition device
45 first roll
46 second roll
48 electrode
47 deflection roll
49 galvanic medium
F conveying direction
S stacking direction
HSE main extension plane
D1 first thickness
D2 second thickness
D3 third thickness
GD total thickness

The invention claimed is:

1. A metal-ceramic substrate carrier for electrical components comprising:
a ceramic layer (10),
a metal layer (20), and
a solder material (30) for bonding the metal layer (20) to the ceramic layer (10), the solder material (30) being arranged between the metal layer and the ceramic layer the solder material comprising:
a base material and
an active metal,
wherein the solder material (30) is a foil having the base material in a first layer (31) and the active metal in a second layer (32), wherein the first layer (31) has a first thickness (D1), the second layer (32) has a second thickness (D2) and a third layer (33) has a third thickness (D3), wherein the second thickness (D2) is thinner than the first thickness (D1) and/or the third thickness (D3), and wherein a ratio of the second thickness (D2) to the first thickness (D1) has a value between 0.01 and 0.3, and wherein the foil has a total thickness (GD) which is less than 25 µm.

2. The metal-ceramic substrate carrier according to claim 1, wherein the foil has a total thickness which is less than 15 µm.

3. The metal-ceramic substrate carrier according to claim 1, wherein said third layer (33) comprises said base material or a further base material, wherein said second layer (32) is arranged along a stacking direction(S) between said first layer (31) and said third layer (33).

4. The metal-ceramic substrate carrier of claim 1, wherein a ratio of the second thickness (D2) to the first thickness (D1) has a value between 0.01 and 0.2.

5. The metal-ceramic substrate according to claim 1, wherein a ratio of the second thickness (D2) to the first thickness (D1) has a value between 0.01 and 0.1.

6. The metal-ceramic substrate carrier solder according to claim 1, wherein the first thickness (D1) is different from the third thickness (D3).

7. The metal-ceramic substrate carrier according to claim 1, wherein the second layer (32) is patterned with a pattern of recesses or cut-outs and/or has interruptions.

8. The metal-ceramic substrate carrier according to claim 1, wherein the foil has a protective layer.

9. The metal-ceramic substrate carrier according to claim 1, wherein a protective layer closes off the solder material (30) in the stacking direction(S).

10. A method of manufacturing a metal-ceramic substrate carrier according to claim 1, comprising joining the first layer (31) and the second layer (32) to form the foil.

11. The method according to claim 10, wherein said third layer (33) comprises said base material or a further base material, wherein said second layer (32) is arranged along a stacking direction(S) between said first layer (31) and said third layer (33) and the third layer (33).

12. The method according to claim 11, further comprising embedding a pattern of recesses or cut in the second layer (32) before assembling the first layer (31) and the second layer (32).

13. A method for the manufacture of the metal-ceramic substrate of claim 1, comprising placing the foil on the metal layer and/or the ceramic layer (10), following formation of the foil, which are bonded to each other with the foil.